(12) United States Patent
Haszto et al.

(10) Patent No.: US 6,192,338 B1
(45) Date of Patent: *Feb. 20, 2001

(54) NATURAL LANGUAGE KNOWLEDGE SERVERS AS NETWORK RESOURCES

(75) Inventors: Edward Dennis Haszto, Basking Ridge; Esther Levin, Livingston; Stephen Michael Marcus, Atlantic Highlands; Roberto Pieraccini, Millington, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/334,916

(22) Filed: Jun. 17, 1999

Related U.S. Application Data (63) Continuation of application No. 08/909,741, filed on Aug. 12, 1997.

(51) Int. Cl.[7] .................................................. G10L 15/18
(52) U.S. Cl. .......................................................... 704/257
(58) Field of Search .................................... 704/231, 270, 704/257, 250; 395/200.33; 379/88, 89

(56) References Cited

U.S. PATENT DOCUMENTS

| | | | |
|---|---|---|---|
| 5,249,293 | * | 9/1993 | Schreiber et al. .................... 395/650 |
| 5,475,792 | * | 12/1995 | Stanford et al. ..................... 395/2.42 |
| 5,513,298 | * | 4/1996 | Stanford et al. ..................... 395/2.52 |
| 5,615,296 | * | 3/1997 | Stanford et al. ...................... 395/2.1 |
| 5,632,002 | * | 5/1997 | Hashimoto et al. .................. 395/2.4 |
| 5,664,061 | * | 9/1997 | Andreshak et al. .................. 704/275 |
| 5,664,126 | * | 9/1997 | Hirakawa et al. .................... 345/329 |
| 5,706,507 | * | 1/1998 | Schloss ................................ 395/615 |
| 5,790,792 | * | 8/1998 | Dudgeon et al. ............... 395/200.42 |
| 5,867,494 | * | 2/1999 | Krishnaswamy et al. ........... 370/352 |
| 5,884,033 | * | 3/1999 | Duvall et al. .................. 395/200.36 |
| 5,918,214 | * | 6/1999 | Perkowski ............................. 705/27 |

OTHER PUBLICATIONS

U.S. applications No. 08/833210, Dragosh et al., filed Apr. 14, 1997.
U.S. application No. 08/886136, Strahs filed Jun. 30, 1997.

* cited by examiner

*Primary Examiner*—Krista Zele
*Assistant Examiner*—Michael N. Opsasnick (57) ABSTRACT

A network resource system includes a first server which can communicate with a client computer. The first server produces a speech signal representing speech from a user at the client computer, and context information which indicates the semantic context of the user's speech and a predefined format in which data are returned to the first server. A network knowledge server is in communication with and separated from the first server. The network knowledge server returns to the first server a text structure having one or more fields corresponding to the predefined format. The first server uses data from the one or more fields to determine a response to the user's speech.

10 Claims, 5 Drawing Sheets

NATURAL LANGUAGE KNOWLEDGE SERVERS AS NETWORK RESOURCES

This application is a continuation of application Ser. No. 08/909,741, filed Aug. 12, 1997, now abandoned.

FIELD OF THE INVENTION

This invention relates generally to speech recognition, and more particularly to a natural language knowledge server for use as a speech recognition resource in a network.

BACKGROUND OF THE INVENTION

The Internet is a global network of interconnected networks and computers which enables users at computers coupled to the networks to exchange information including data, images, voice, recorded sound, and electronic mail. Computers connected to the Internet may be classified as client computers ("clients") and server computers ("servers"). Servers are repositories of information. Internet users access the information present at the servers using client computers. Protocols establish the manner of information exchange between clients and other clients, between clients and servers, and between servers and other servers. The hypertext transfer protocol is one example.

Although natural language processing systems are beginning to emerge, capable of appropriate responses to spoken or typed queries, the integration of such capabilities into network applications is complex and time consuming. Customization for each application requires highly specialized knowledge outside the domain of normal application developers. Developing applications for performing speech recognition requires highly specialized knowledge.

In a conventional arrangement, a client computer is communicatively coupled to a single server computer according to a client-server architecture. Packets of data representing speech are passed from the client computer to the server computer. The server computer is capable of performing automatic speech recognition and also interpreting the results of the speech recognition. In the single "monolithic" server computer, the speech recognition function is tightly coupled to the function that interprets recognition results for a specific task domain. The two functions are likely accomplished in the same application running on the monolithic server computer.

While intimate knowledge about the task domain allows small improvements to be made in the speech recognition function, and knowledge of characteristics of the speech recognition function allows specific improvements in the result interpretation function, such improvements are made difficult by the complex interdependency of the application functions performed by the monolithic server computer. Shortcomings of this approach are that it is not easy to separate the two functions of speech recognition and result interpretation in the single monolithic server computer, and thus, the monolithic server computer cannot be applied to a new task without extensively redesigning both functions. For the same reason, as technology improves, it is often difficult to add new or improved functionality without a similar redesign of the single monolithic server computer.

SUMMARY OF THE INVENTION

An illustrative network resource system includes a first server which is capable of communicating with a client computer. The first server produces (i) a speech signal representing speech from a user at the client computer, and (ii) context information which indicates the kind of application the first server is running, the semantic context of the application, any prior knowledge relating to the user's request and a predefined format in which data are returned to the first server. A network knowledge server is in communication with and separated from the first server. The network knowledge server returns to the first server a text structure having one or more fields corresponding to such predefined format. The first server uses data from such one or more fields to determine a response to the user's speech.

Other features and advantages of the invention will become apparent from the following detailed description, taken in conjunction with the accompanying drawing, which illustrates, by way of example, the features of the invention.

DETAILED DESCRIPTION

For a better understanding of the invention, together with other and further objects, advantages, and capabilities thereof, reference is made to the following disclosure and the figures of the drawing, where like reference characters designate like or similar elements. For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

The invention provides a network resource system including a network knowledge server capable of receiving a request, which includes speech data and contextual information, and converting the speech data into a text response. The network knowledge server is coupled, according to a first embodiment of the invention, to a first server in the form of a web server which presents the speech data and contextual information to the network knowledge server in order to obtain the text results. The web server can be an "e-commerce server." "E-commerce" denotes commerce conducted on the Internet, particularly the World Wide Web, or on another network of computers. "E-commerce server" denotes a server used as part of conducting business on the Internet or other computer network. According to a second embodiment of the invention, the network knowledge server is coupled to a first server in the form of an interactive voice response system for telephone system applications. The interactive voice response system makes a request, in the form of speech data and contextual information, to the network knowledge server in order to obtain a text response therefrom.

Figure 1:
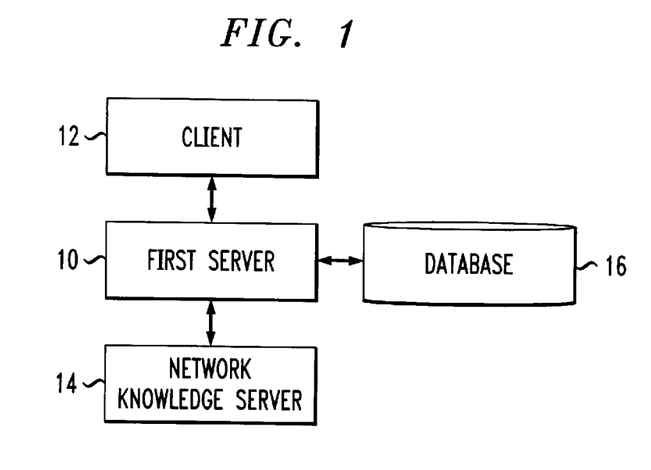
FIG. 1 illustrates a network resource system in accordance with the principles of the invention.

Referring to FIG. 1, an illustrative network resource system in accordance with the principles of the invention includes a first server 10 which can communicate with a client computer 12. A network knowledge server 14 is in communication with and separated from the first server 10. The first server 10 produces (i) a speech signal representing speech from a user at the client computer 12, and (ii) context information which indicates the kind of application the first server is running, the semantic context of the application, any prior knowledge relating to the user's request and a predefined format in which data are returned to the first server 10. The network knowledge server 14 returns to the first server 10 a text structure having one or more fields corresponding to such predefined format. The first server 10 uses data from such one or more fields to determine a response to the user's speech, such as by querying a database 16.

Figure 2:
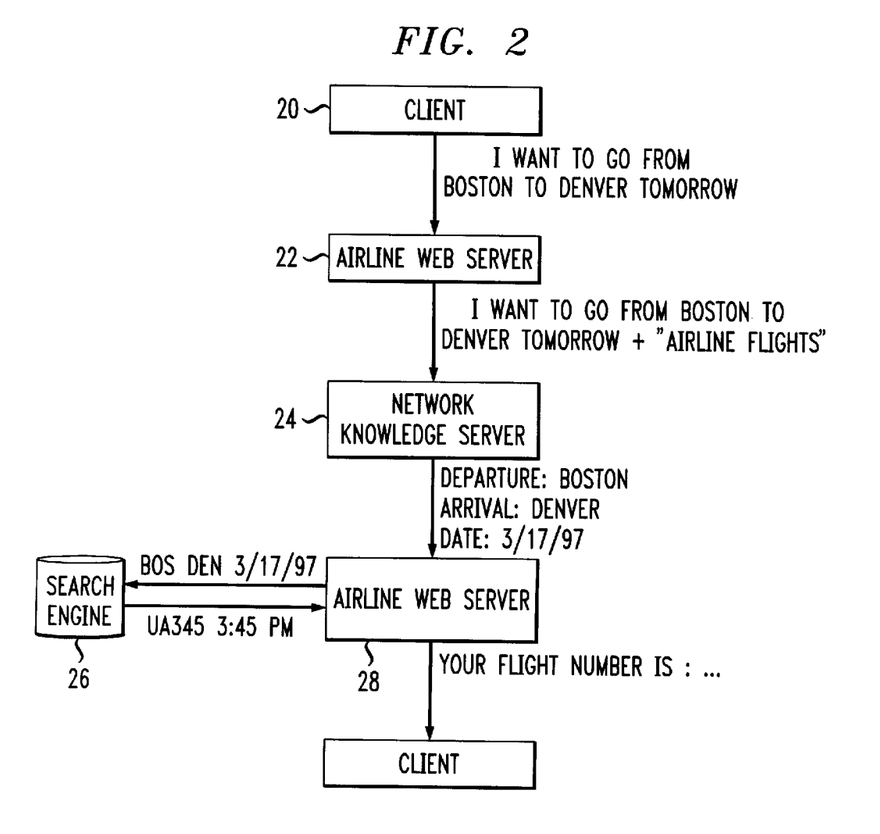
FIG. 2 illustrates an exemplary process performed by the network resource system depicted in FIG. 1 according to the principles of the invention.

FIG. 2 illustrates a process performed by the network resource system depicted in FIG. 1, in which an airline web server (i.e., the first server) is in communication with a voice-enabled client computer, which supports a web browser.

A user operates the client computer using the web browser. In step 20, the client computer presents a digital speech signal representing the user's speech ("I want to go from boston to denver tomorrow") to the airline web server. In step 22 the airline web server produces (i) a speech signal representing speech from the user at the voice-enabled client computer ("I want to go from boston to denver tomorrow"), and (ii) context information which indicates the kind of application the first server is running, the semantic context of the application, any prior knowledge relating to the user's request and a predefined format in which data are returned to the airline web server ("AIRLINE FLIGHTS"). A network knowledge server is in communication with and separated from the airline web server. In step 24, the network knowledge server processes the speech signal representing the user's speech. The network knowledge server recognizes the user's speech based on the speech signal. Using the context information, the network knowledge server generates and returns to the airline web server a text structure having one or more fields corresponding to such predefined format ("DEPARTURE:BOSTON; ARRIVAL:DENVER; DATE:3/17/97"). In step 26, a search engine associated with the first server uses data from such one or more fields ("BOSTON; DENVER; 3/17/97") to determine a result ("UA345; 3:45 PM"), which in this example indicates a flight number and time that satisfies the service needs of the user at the client computer. In step 28, the airline web server sends a message to the client computer indicating the flight ("Your flight number is UA345").

In another example of context information in an airline scenario, the knowledge "ARRIVAL:DENVER" is known from previous interaction with the user (either the user has said he is going to Denver already, or has possibly been browsing a Denver vacation web page) and is sent with the knowl edge "AIRLINE FLIGHTS," along with the speech signal to the network knowledge server in step 22.

Figure 3:
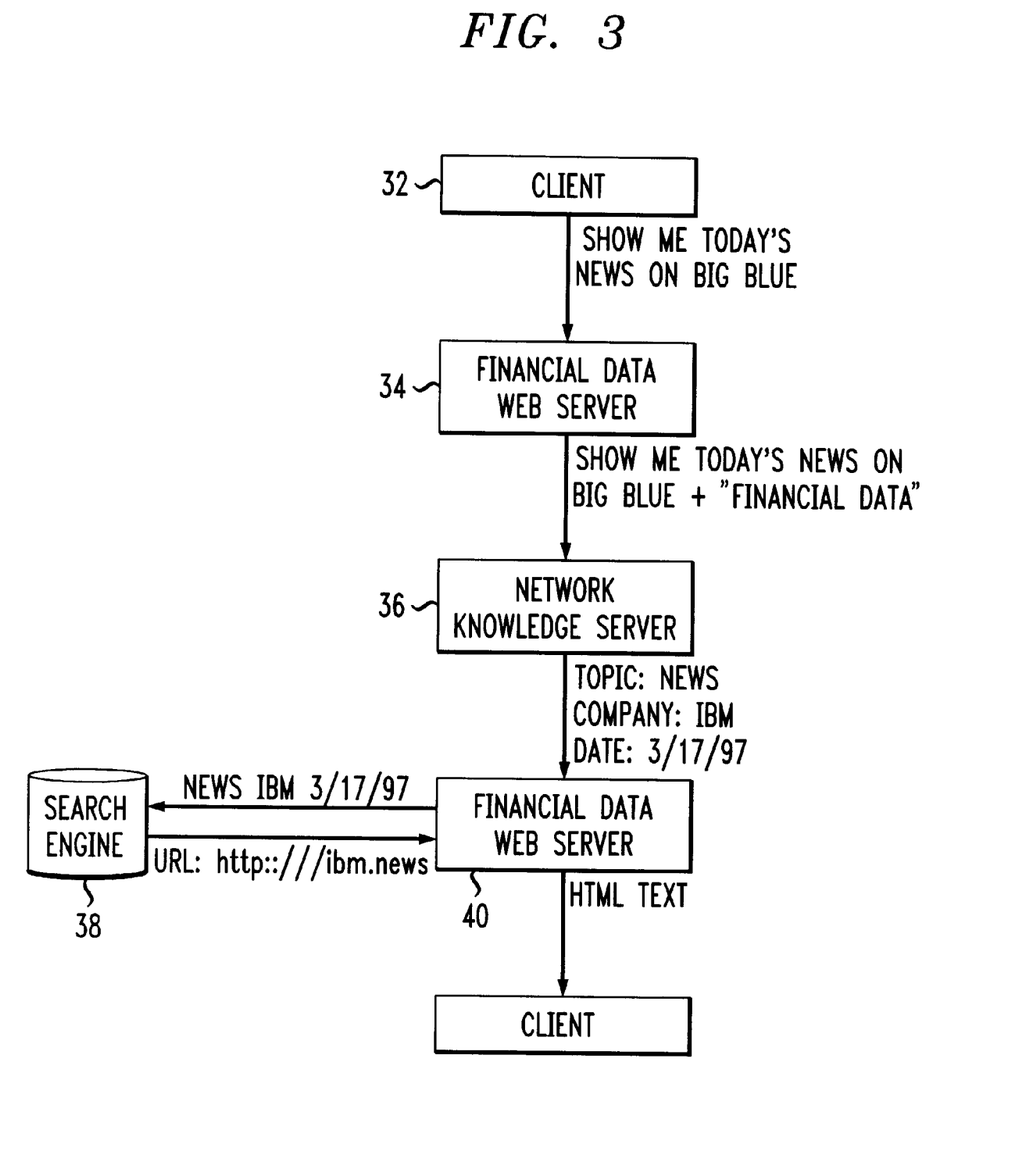
FIG. 3 illustrates an exemplary process performed by the network resource system depicted in FIG. 1 according to the principles of the invention.

FIG. 3 illustrates an exemplary process that can be performed by the network resource system shown in FIG. 1. The network resource system includes, as the first server, a financial data web server which can communicate with a client computer. The financial data web server could be owned by a company in the business of providing financial data and business news services. A user at a voice-enabled client computer uses a web browser on the client computer to interact with a web site supported by the financial data web server. In step 32, the user at the client computer speaks his request to his voice-enabled client computer ("show me today's news on big blue") and the client computer sends a digital speech signal representing the user's speech to the financial data web server. In response to the digital speech signal from the client computer the financial data web server produces in step 34 (i) a speech signal representing the user's speech ("show me today's news on big blue"), and (ii) context information ("FINANCIAL DATA") that indicates an application type, the semantic context of the user's request, and the predefined format in which data are returned to the financial data web server, and sends these data to the network knowledge server. The network knowledge server, which is separated from the financial data web server, recognizes the speech signal representing the user's speech; and, specifically in this example recognizes that "big blue" refers to the company "IBM". In step 36, the network knowledge server returns to the financial data web server a text structure having a number of fields corresponding to such predefined format ("TOPIC:NEWS; COMPANY:IBM; DATE:3/17/97"). The financial data web server delivers data from the fields of the text structure ("NEWS; IBM; 3/17/97") to a search engine. In step 38, the search engine determines a result ("URL:http::///ibm.news") that is responsive to the needs of the user at the client computer, which in this example is the address of a web page that displays information about the company "IBM." In step 40, the financial data web server sends this URL address to the client computer in the form of html text.

Figure 4:
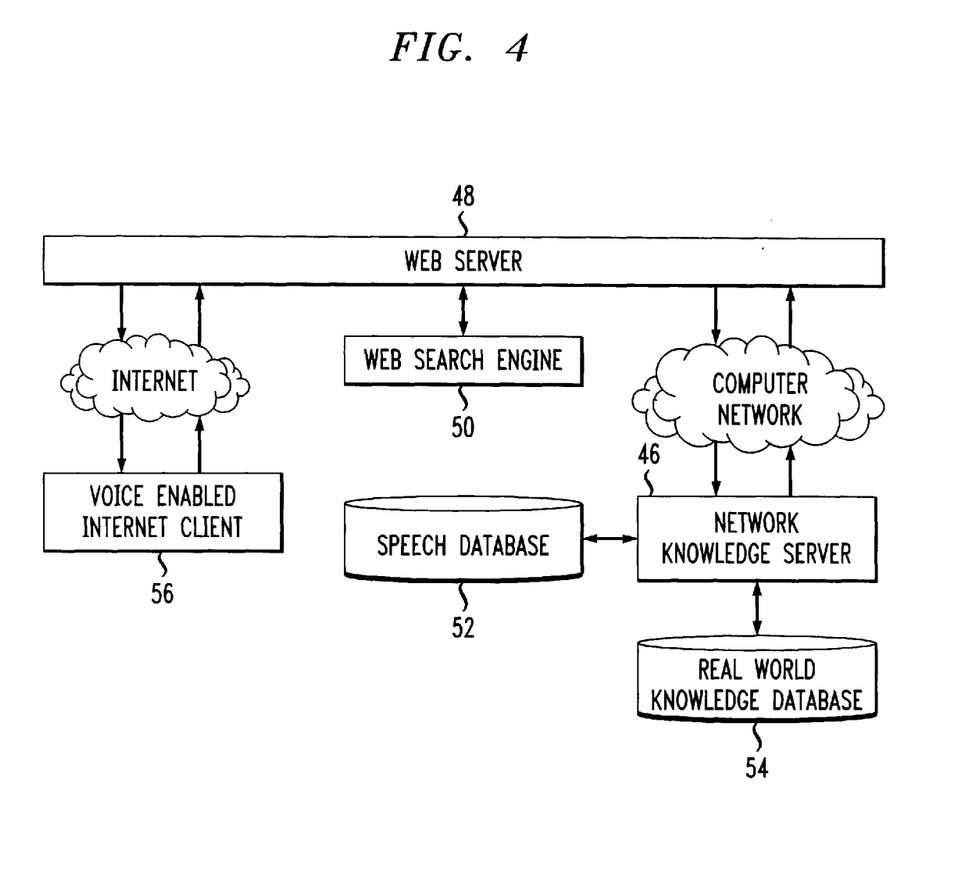
FIG. 4 illustrates a network resource system according to the principles of the invention.

Referring to FIG. 4, a network resource system in accordance with a specific embodiment of the invention includes a network knowledge server 46 operative to generate text results responsive to receiving speech data and contextual information. Techniques for accomplishing automatic speech recognition (ASR) are well known, and products and services that utilize some form of automatic speech recognition ("ASR") methodology have been introduced commercially. The network knowledge server 46 in this specific embodiment can be a computer having processing capability sufficient for running complex ASR-based applications. For example, the AT&T Corporation has developed an ASR engine called WATSON™ that enables development of complex ASR services. Desirable attributes of complex ASR services that would utilize such ASR technology include high accuracy in recognition; robustness to enable recognition where speakers have differing accents or dialects, and/or in the presence of background noise; ability to handle large vocabularies; and natural language understanding. In order to achieve these attributes for complex ASR services, ASR techniques and engines typically require computer-based systems having significant processing capability in order to achieve the desired speech recognition capability. Processing capability as used herein refers to processor speed, memory, disk space, as well as access to application databases. Various aspects of speech recognition theory and practice are described in U.S. Pat. No. 5,579,436 entitled "RECOGNITION UNIT MODEL TRAINING BASED ON COMPETING WORD AND WORD STRING MODELS," issued Nov. 26, 1996 to Chou et al., which is incorporated by reference as if fully set forth herein.

A web server 48 is communicatively coupled to the network knowledge server 46 in a computer network. The web server 48 provides the speech data and context information in order to retrieve structured text results.

A web search engine 50 is communicatively coupled to the web server 48. A speech database 52 is communicatively coupled to the network knowledge server 46. The speech database 52 stores recognition models used in the speech recognition process. A real-world knowledge database 54 is communicatively coupled to the network knowledge server 46. Each of the speech database and the real-world knowledge database is used by the network knowledge server 46 to recognize speech and for identifying pertinent utterances of a text transcription in accordance with the context information.

The web server 48 is adapted to run a preexisting application, and generate a user interface (which can be a web page on the Internet) based on the preexisting application. The user interface presents a set of prompts and displays. The web server 48 is able to capture speech data and context information produced by a voice-enabled Internet client 56 interacting with the user interface. The client computer 56 in this specific embodiment can be a personal computer (PC) having sufficient processing capability for running client applications such as a web browser, which enables a client to interact with web servers. Examples of web browsers are the Netscape Navigator™ available from Netscape Communications, Inc., and the Internet Explorer™ available from Microsoft Corporation. Web servers and the information available therein are typically identified and addressed through a Uniform Resource Locator (URL)-compatible address. The client computer 56 in this specific embodiment includes hardware, such as a microphone, and software for the input and capture of audio sounds, such as speech. Methods for connecting microphones to a PC and capturing audio sounds, such as speech, at the PC are well known. Examples of speech handling capabilities for PCs include the Speech Application Programmer Interface (SAPI) from Microsoft Corporation and the Advanced Speech Application Programmer Interface (ASAPI) from AT&T Corporation. Details of the Microsoft SAPI are found in, e.g., a publication entitled "Speech API Developers Guide, Windows™ 95 Edition," Vers. 1.0, Microsoft Corporation (1995), and details of the AT&T ASAPI are provided in a publication entitled "Advanced Speech API Developers Guide," Vers. 1.0, AT&T Corporation (1996); each of these publications is incorporated herein by reference. The web server 48 provides a textual response to the captured speech and any context information received from the voice-enabled Internet client 56.

According to the principles of the invention, a user at a web browser running on the voice-enabled client computer 56 is interacting with a web site 48 that provides information on movies. The user wishes to search for articles on a specific topic. The user speaks her request to her voice-enabled web browser 56, which sends a representation of the speech to the web site 48. The web site forwards the representation of the speech to the network knowledge server 46, together with some context information describing the semantic domain (e.g., "FILMS"). The spoken request might be: "show me the animated film with the poison apple."

The network knowledge server 46 queries the speech database 52 and/or the real world database 54 and uses data and speech recognition models specifically for the movie domain to recognize this speech and determine appropriate text fields, and returns the text fields "ANIMATED" and "POISON APPLE" to the requesting web site 48 in a predefined format corresponding to the semantic domain "FILMS." The web site 48 then uses its own search engine 50 to determine from the topical text results that one possible match is "SNOW WHITE". The web site server 48 sends appropriate information to the user at the client computer 56.

In order for the network knowledge server to know that "POISON APPLE" is a relevant topic, it will be using data (stored, for example, in the real-world knowledge database 54) which includes a description of the film "Snow White". This interpretation is only made implicitly by the network knowledge server 46, and it is left to the requesting web site server 48 to determine the most appropriate interpretation of the topic "POISON APPLE" relative to its own database (e.g., the web search engine 50), and possibly its own history of interactions with the user.

The likelihood that the speech recognition process returns useful text responses can be increased by programming the network knowledge server 46 to return an ordered set of alternative responses (i.e., the "N best" results). The requesting web site also can make use of the fact that the network knowledge server's results have been obtained from speech, and apply available phonetic matching techniques to the structured text response if direct matching fails.

Figure 5:
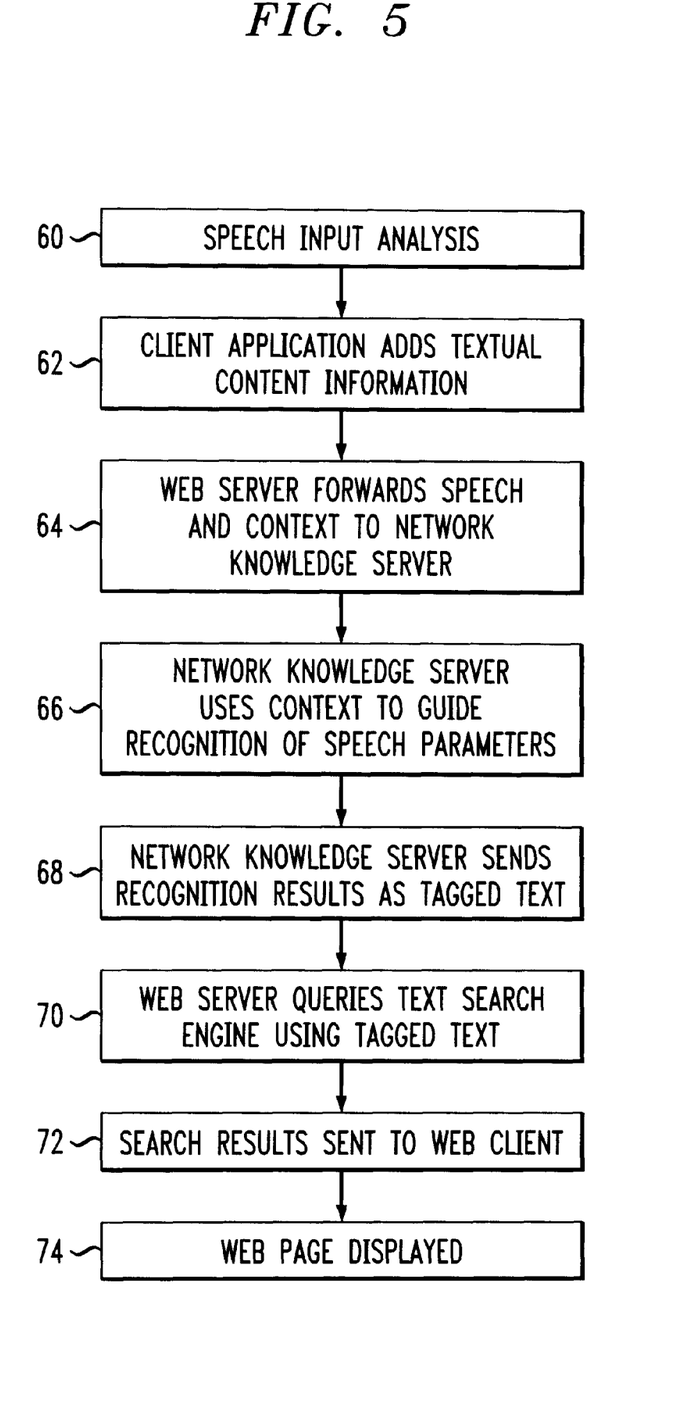
FIG. 5 is a process flow diagram illustrating operation of the network resource system depicted in FIG. 4.

FIG. 5 further illustrates operation of the network resource system depicted in FIG. 4. Referring to FIG. 5, spoken input is analyzed in step 60 and converted into a representation suitable for transmission over a network. In Internet applications, this will be a set of speech parameters. For a telephone network application, the representation suitable for transmission will depend on the means normally used for carrying speech. optionally, in step 62 the client application used by the user may add some textual context information. The client application sends the speech parameters without further analysis, and the optional context information, to a web server.

The web server determines the network knowledge server to which the speech is appropriately sent, possibly based on the accompanying context information. The speech parameters are not modified or analyzed by the web server, while context information may be modified or augmented by the web server. The web server forwards the speech representation and context information to the network knowledge server in step 64.

The network knowledge server receives the speech parameters, plus context information, and uses the most appropriate speech recognition capabilities it has in order to deliver recognition results as tagged (i.e., marked-up) text in step 66. The network knowledge server returns recognition results to the web server according to a predefined format that the web server will understand in step 68.

The web server receives the tagged recognition results and uses appropriate fields of the recognition results to query the search engine in step 70. A web page in html format is generated from the query results and delivered to the client in step 72. A web page response is displayed to the user on her web browser in step 74.

Figure 6:
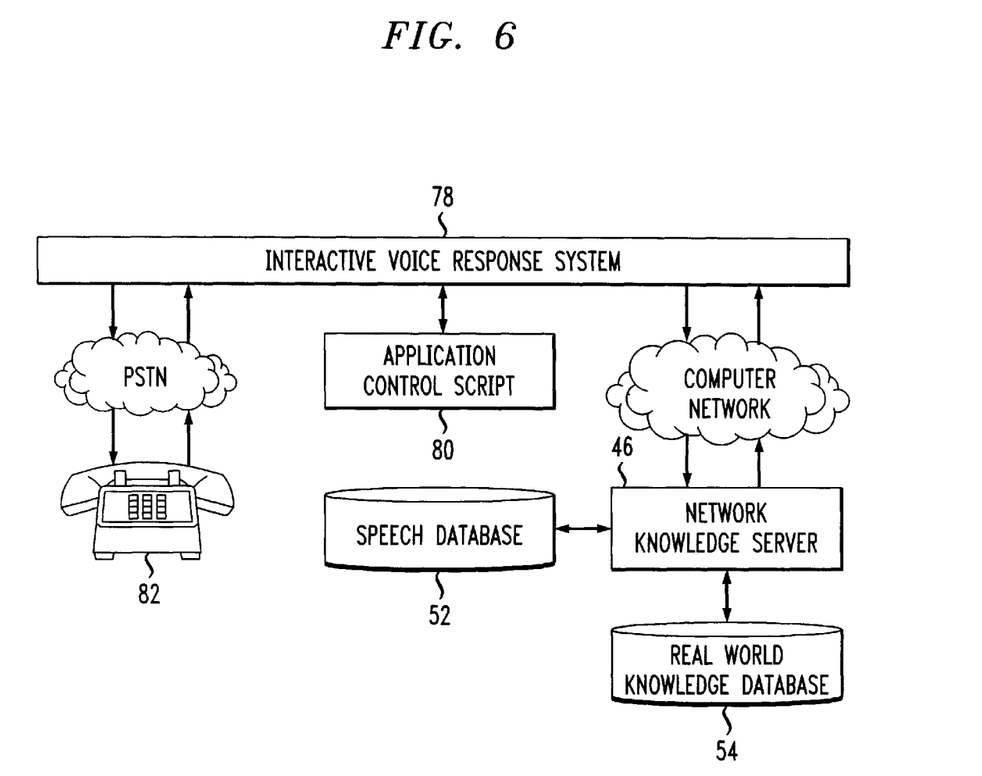
FIG. 6 illustrates a network resource system according to the principles of the invention.

Referring to FIG. 6, a network resource system according to a specific embodiment of the invention includes a network knowledge server 46 and an interactive voice response system 78. The network knowledge server 46 produces tagged text results in the form of a text structure having one or more fields corresponding to a predefined format that the interactive voice response system will understand in response to speech data and context information identifying such predefined format, while the interactive voice response system 78 produces speech data and context information in order to obtain the tagged text results. An application control script 80 associated with the interactive voice response system 78 controls operation of the interactive voice response system 78 to process the tagged text results. A speech database 52 used for speech recognition is communicatively coupled to the network knowledge server 46. A real-world knowledge database 54 is communicatively coupled to the network knowledge server 46. A telephone 82 is communicatively coupled to the interactive voice response system 78 through the public switched telephone network (PSTN). The interactive voice response system 78 generates voice prompts for a telephone user and can capture speech from the prompted telephone user.

In response to captured spoken utterances from a user at telephone 82, the interactive voice response system 78 sends a request to the network knowledge server 46. The request made by the interactive voice response system 78 is in the form of speech data and context information which indicates any knowledge relating to the user's request and a predefined format in which a structured text response should be returned to the interactive voice response system. The network knowledge server 46 queries the speech database 52 and/or the real world knowledge database 54 and converts such request into a response in text form according to the predefined format.

In the network resource system embodied as described above for application with the public switched telephone network or a local area telephone network, the network knowledge server 46 can be used as a resource to process spoken dates. According to an illustrative example, travel information is being requested by a caller using the telephone 82 coupled to the interactive voice response system 78 through the public switched telephone network. In the example, the departure date for the caller has already been determined by the interactive voice response system using the speech recognition capabilities of the network knowledge server 46. The application control script 80 is now at the stage of determining the return date. The interactive voice response system 78 prompts the caller. The caller is able to respond with a range of language behavior, including absolute dates, relative dates ("three days later"), and relative information that requires some absolute reference ("the Sunday after").

A representation of the caller's speech is collected by the interactive voice response system 78. The interactive voice response system 78 sends the collected speech through the computer network to the network knowledge server 46, along with some context information. The context information indicates in addition to the predefined format of the response expected by the interactive voice response system, the type of response likely given by the user in response to the prompting and thus the semantic context of the speech to be recognized. For example, the context information indicates that the spoken answer provided by the user in response to prompting by the interactive voice response system will likely be: ((i) "date with optional time requested", (ii) "date is relative to <departure date>"). Such an indication that the user probably will be saying the date and time desired to fly and that in the utterance the date and time desired to fly will be phrased relative to another day helps the network knowledge server 46 recognize the speech and produce a valuable text response. The network knowledge server 46 returns its text interpretation of the spoken date and time to the interactive voice response system 78 for use by the application control script 80. The interactive voice response system continues its interactions with the caller at the telephone 82.

In addition to a prompt-constrained type of interaction with the caller, other scenarios are possible, for example where additional context information (in text form) is included with the speech data, and a more open dialogue is used. Various escape responses for requesting agent intervention, or to repair a previous erroneous response, can be used in the application control script 80 to obtain information allowing the interactive voice response system 78 to respond appropriately.

It is also contemplated that the principles of the invention can be applied in situations where the network knowledge server will not require context information in order to provide a response to a request from another server.

From the foregoing it will be appreciated that the invention provides network knowledge servers for use as shared network resources for natural language processing. These knowledge servers may be accessed by a wide range of applications sending natural language input to the knowledge server and receiving simple text fields in reply. The task of the application developer is thereby simplified and does not involve a detailed understanding of natural language processing. Conversely, the knowledge server requires only a broad general knowledge of language behavior within a particular semantic domain, without a detailed understanding of a specific application.

While several particular forms of the invention have been illustrated and described, it will also be apparent that various modifications can be made without departing from the spirit and scope of the invention.

What is claimed is:

1. A network resource system, comprising:
   a plurality of web servers;
   wherein each of said plurality of web servers provides a commercial service and produces (i) a speech signal representing speech from a user of said commercial service, and (ii) context information;
   wherein said context information reflects said commercial service and a predefined format in which data are returned to said web server;
   wherein said context information varies among said plurality of web servers; and
   a network knowledge server in communication with and separated from said plurality of web servers;
   wherein said network knowledge server receives said speech signal and said context information and returns to each of said plurality of web servers a text structure having one or more fields based on said context information associated with said web server.

2. A system as defined in claim 1, further comprising:
   a search engine associated with at least one of the web servers that uses data from said one or more fields and returns a result to its associated web server.

3. A system as defined in claim 1, further comprising:
   a script controlling operation of at least one of the web servers.

4. A system as defined in claim 1, wherein:
   at least one of the web servers produces voice prompts for a telephone user and captures speech from a telephone user.

5. A method of recognizing speech for use in a computer network, comprising the following steps:
   sending from each of a plurality of web servers to a network knowledge server (i) a speech signal representing speech, and (ii) context information;
   wherein each of said plurality of web servers provides a commercial service;

receiving said speech signal and said context information at said network knowledge server;

wherein said context information reflects said commercial service and a predefined format in which data are returned to said web server;

wherein said context information varies among said plurality of web servers;

receiving by each of said plurality of web servers a text structure having one or more fields based on said context information associated with said web server.

6. A method as defined in claim 5, further comprising the step of:

querying a database using data from said one or more fields to determine a response.

7. A method as defined in claim 5, wherein:

said plurality of web servers and said network knowledge server are separated in said computer network.

8. A method as defined in claim 5, further comprising the step of:

adapting each of said plurality of web servers to (i) run a preexisting application, (ii) generate a user interface based on said preexisting application, said user interface presenting a set of prompts and displays, and (iii) capture a speech signal produced by a client computer interacting with said user interface.

9. A method as defined in claim 5, wherein:

each of said plurality of web servers is adapted to produce voice prompts for a telephone user and capture speech produced by said telephone user in response to said voice prompts.

10. A method of providing a speech recognition service to a plurality of web servers, comprising the steps of:

receiving at a network knowledge server and from a plurality of web servers via a computer network (i) a speech signal representing speech, and (ii) context information;

wherein each of said plurality of web servers provides a commercial service;

wherein said context information reflects said commercial service and a predefined format in which data are returned to said web server;

wherein said context information varies among said plurality of web servers;

performing a speech recognition process on said speech signal; and returning to each of said plurality of web servers a text structure having one or more fields corresponding to said predefined format associated with said web server.

\* \* \* \* \*